United States Patent
Shen et al.

(10) Patent No.: US 9,998,413 B2
(45) Date of Patent: Jun. 12, 2018

(54) COMPUTER-IMPLEMENTED SYSTEM AND METHOD FOR PRIORITIZING ELECTRONIC MESSAGES BASED ON IMPORTANCE

(71) Applicant: Palo Alto Research Center Incorporated, Palo Alto, CA (US)

(72) Inventors: Jianqiang Shen, Santa Clara, CA (US); Masafumi Suzuki, Mountain View, CA (US); Oliver Brdiczka, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 508 days.

(21) Appl. No.: 14/581,945

(22) Filed: Dec. 23, 2014

(65) Prior Publication Data

US 2016/0182420 A1  Jun. 23, 2016

(51) Int. Cl.
*G06F 15/16* (2006.01)
*H04L 12/58* (2006.01)

(52) U.S. Cl.
CPC .............. *H04L 51/12* (2013.01); *H04L 51/22* (2013.01); *H04L 51/26* (2013.01)

(58) Field of Classification Search
CPC ......... H04L 51/12; H04L 51/22; H04L 51/26; G06F 17/30867; G06F 17/2785; G06F 17/30648; G06F 17/30528; G06F 17/3053
USPC ....................................................... 709/206
See application file for complete search history.

(56) References Cited

U.S. PATENT DOCUMENTS

| | | | | |
|---|---|---|---|---|
| 6,823,325 | B1 * | 11/2004 | Davies | G06F 17/271 706/50 |
| 2003/0187937 | A1 * | 10/2003 | Yao | H04L 12/585 709/206 |
| 2005/0204001 | A1 * | 9/2005 | Stein | G06Q 10/107 709/206 |
| 2007/0168430 | A1 * | 7/2007 | Brun | G06Q 10/107 709/206 |
| 2012/0149342 | A1 * | 6/2012 | Cohen | H04L 12/587 455/412.2 |
| 2012/0240020 | A1 * | 9/2012 | McKeown | G06Q 10/10 715/205 |
| 2013/0289939 | A1 * | 10/2013 | Brdiczka | G06Q 50/01 702/179 |
| 2015/0295876 | A1 * | 10/2015 | Newman | G06Q 10/107 709/206 |

* cited by examiner

*Primary Examiner* — Oleg Survillo
*Assistant Examiner* — Imran Moorad
(74) *Attorney, Agent, or Firm* — Patrick J. S. Inouye; Krista A. Wittman

(57) ABSTRACT

A system and method for prioritizing messages based on message importance is provided. Messages from one or more senders are received for a recipient. For each message, an identity of the sender is determined. A determination is made as to whether each message includes a request for an action to be performed. Also, a length of time required to read that message is determined for each message. An importance value for each message is then calculated based on the identity of the sender, whether a request is included in the message, and the length of time to read the message. Those messages with high importance values are identified as high priority messages and are provided to the recipient.

22 Claims, 9 Drawing Sheets ents of the invention by way of illustrating the best mode

COMPUTER-IMPLEMENTED SYSTEM AND METHOD FOR PRIORITIZING ELECTRONIC MESSAGES BASED ON IMPORTANCE

FIELD

This application relates in general to analyzing messages and, in particular, to a system and method for prioritizing electronic messages based on importance.

BACKGROUND

As technology advances, the number of individuals using mobile computing devices steadily increases. The mobile computing devices allow users to communicate or connect with others via telephone calls or electronic messaging, such as SMS text messaging, Instant Messaging, email, and messaging through various social networking sites. Due to high volumes of users and frequent use, individuals can become inundated with electronic messages, such that reviewing all the messages requires longs periods of time. Additionally, large amounts of messages may result in users deleting unread messages to save time or inadvertently skipping important messages.

Finding large chunks of time throughout the day to carefully review all messages can be challenging. For example, a student may only have a few minutes between classes to check his or her phone and is unable to check all received messages. Being able to identify the most important messages for review would allow the student to view the important messages in a more timely manner than the messages that are less important. Further, when driving, individuals have a very limited time window to check their messages, such as at a red light. If the driver was able to identify a message that was very important, he may be able to view the message at the red light before the light turns green.

Current methods exist for prioritizing messages within a particular communication channel or social networking application. For example, users are able to flag an email message as having high importance so that the intended recipient understands the importance of the message. However, an email message marked as important by a sender may not be important to the recipient. Further, the ability to flag messages is only available for messages within a particular email application, not other types of messages, such as social networking posts or SMS text messages.

Therefore, there is a need for prioritizing messages and providing the most important messages to a recipient for review, especially during limited time periods for review. Preferably, the data prioritization considers a sender of the message, a content of the message, and a length of the message.

SUMMARY

Individuals that receive large amounts of electronic messages and notifications can become overwhelmed and may inadvertently skip or delete important messages in a rush to go through the messages. To ensure that the individual views the important messages, especially during limited time windows for review, the messages can be prioritized based on factors, including a sender of the messages, a content of the messages and a length of the messages. Specifically, each message can be analyzed for the factors and a priority score is calculated. Those messages with higher priority scores can be identified as important messages and provided to the user. Further, one or more sections of an important message with high importance can be highlighted and provided to the individual.

An embodiment provides a computer-implemented system and method for prioritizing messages based on message importance. Messages from one or more senders are received for a recipient. For each message, an identity of the sender is determined, and a determination is made as to whether each message includes a request for an action to be performed. Also, a length of time required to read that message is determined for each message. An importance value is then calculated for each message based on the identity of the sender, whether a request is included in the message, and the length of time to read the message. Those messages with high importance values are identified as high priority messages and are provided to the recipient.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

With an increase in social networking and mobile phone usage, users are becoming overwhelmed with large amounts of electronic messages and notifications. For example, in a single day, a user may receive voicemail messages and notifications, Facebook messages and notifications, text messages, email messages, and Snapchat notifications, as well messages and notifications from other communication channels. Finding time to check and review all the messages and notifications can become challenging and often times, users will check messages at various times throughout the day, such as between classes, during a break from work, or while stopped at a red light, which provide only a limited time window. The limited time windows can prevent a user from reviewing all received messages at that time, which can result in timely viewing an important message. To allow users to view the most important messages first, especially during limited time windows for review, the messages can be prioritized, and those messages with a high priority can be provided to the user and distinguished from messages with a lower priority that can be checked at a later time.

Figure 1:
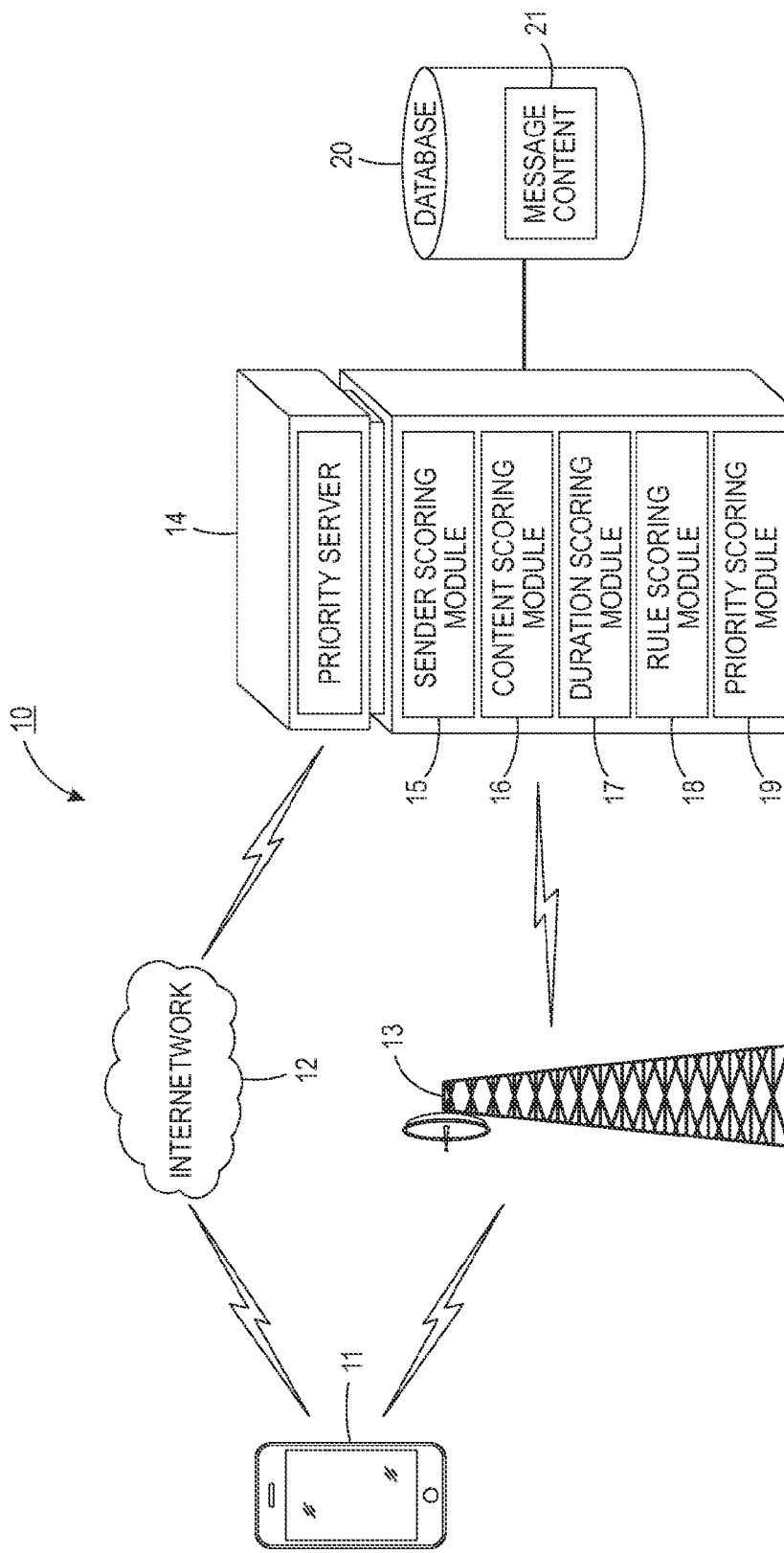
FIG. 1 is a block diagram showing a computer-implemented system for prioritizing electronic messages based on importance, in accordance with one embodiment.

Prioritizing messages helps a recipient identify which messages are most important and should be reviewed first. FIG. 1 is a block diagram showing a computer-implemented system 10 for prioritizing electronic messages based on importance, in accordance with one embodiment. A user receives electronic messages and notifications via a desktop computer (not shown) or mobile computing device, such as a smart phone 11, tablet (not shown), or laptop (not shown). The electronic messages and notifications can be sent to the user from a desktop computer (not shown) or mobile computing device 22, 23, 24 of a sender via a communication channel, including email, SMS text messaging, Instant Messenger, and social networking sites, including Facebook, Twitter, Instagram, and Snapchat. Other communication channels are possible. An electronic message includes substantive information from a sender, while a notification includes notice that a message has been received. Prior to receipt of the electronic messages or notifications by the user, the electronic messages and notifications can be transmitted from the sender to a priority server 14 for determining an importance of each message.

Depending on message type, an electronic message can be transmitted from the sender to the priority server and from the priority server to the user via an Internetwork 12, such as the internet, or via a cellular network 13. For example, SMS text messages can be transmitted from the sender to the priority server 14 and from the priority server to the user via the cellular network 13. Meanwhile, emails, Instant Messenger messages, and social network messages can be transmitted via the internet 12.

Once received by the priority server 14, the messages 21 are stored in a database 20 interconnected to the priority server 14. The messages 21 can be from the same or different communication channels. The priority server 14 accesses the messages from the database for analysis by a sender scoring module 15, a content scoring module 16, a duration scoring module 17, a rule scoring module 18, and a priority scoring module 19. The sender scoring module 15 calculates a sender score based on an identity of the message sender. The content scoring module 16 calculates a content score based on the terms in the message. The duration scoring module 17 calculates a duration score based on an amount of time that is required to read the message, and the rule scoring module 18 calculates a rule-based score based on whether the message includes a sender or terms on a predetermined list. Finally, the priority scoring module 19 calculates a priority score for the message based on the sender score, content score, duration score, and rule-based score.

The priority score is assigned to the message, which is transmitted to the mobile device 11 of the user. The newly-received messages on the user's mobile device are then prioritized, or ordered, based on the priority score. The messages with highest priority are identified as important messages and distinguished from those messages with lower priority.

The desktop computer, mobile computing devices, and server can each include a central processing unit and one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the computing devices and server can act as a specialized computer. For instance, when the modules are implemented as hardware, that particular hardware is specialized to perform message prioritization and other computers cannot be used. Additionally, when the modules are burned into read-only memory components, the computing device or server storing the read-only memory becomes specialized to perform the message prioritization that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
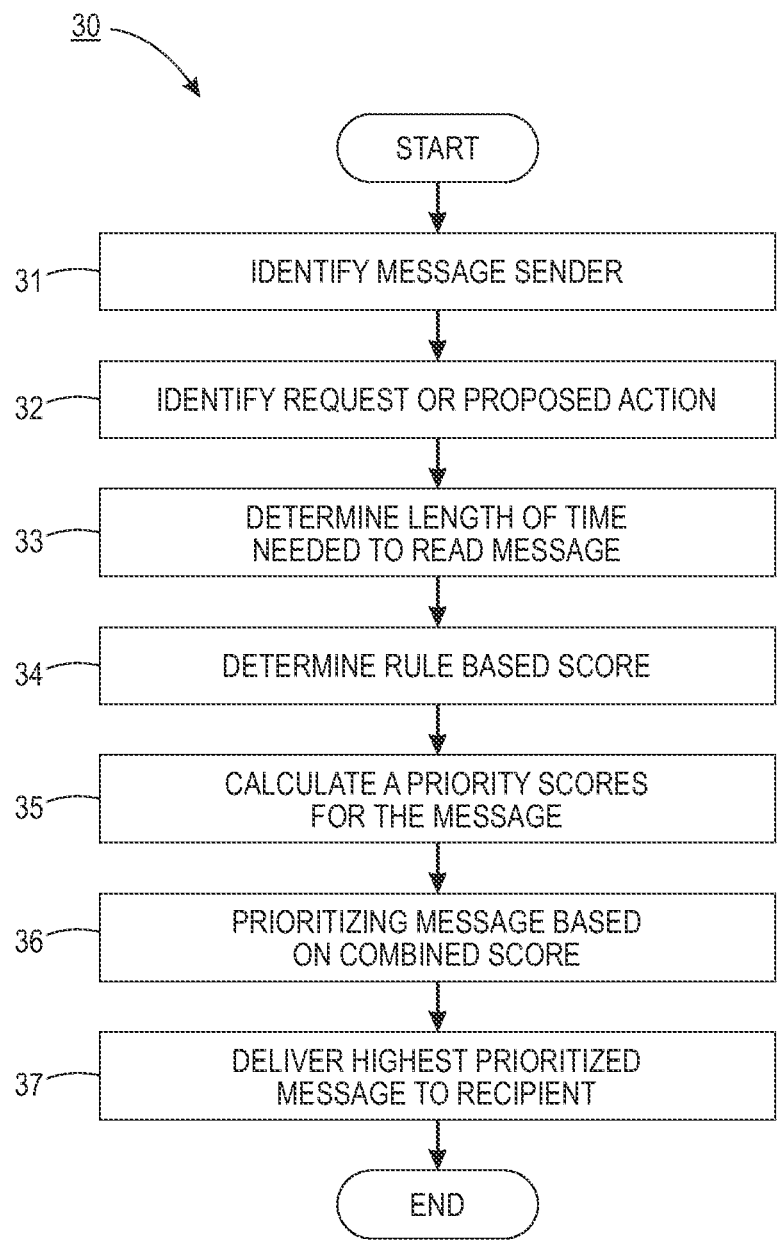
FIG. 2 is a flow diagram showing a computer-implemented method for prioritizing electronic messages based on importance, in accordance with one embodiment.

Determining message importance guides users with limited amounts of time to those messages that are the most important. FIG. 2 is a flow diagram showing a computer-implemented method for prioritizing electronic messages based on importance, in accordance with one embodiment. Messages intended for a user are analyzed to determine an importance of each message for prioritization. For each message, an identity of the sender is determined (block 31) and a sender priority score is assigned to that message, as further described below with reference to FIG. 3. A determination (block 32) is made as to whether the message includes a request for action or a proposed action, and a content score is assigned to the message based on a presence or absence of the request or proposed action, as described below with reference to FIG. 4. Next, a length of time needed to read the message is determined (block 33) and a duration score is assigned to the message based on the determined length of time, as further described below with reference to FIG. 5. Predetermined rules are applied (block 34) to the message and a rule-based score is assigned based on a satisfaction of one or more of the rules, as further described below with reference to FIG. 7. Finally, a priority score is determined (block 35) and assigned to each message. The messages are then prioritized based on the assigned priority scores. Those messages with the highest priority scores are provided to the user as high priority, important messages. In one embodiment, the priority score is a binary variable with a value of 1 indicating high importance and 0 indicating low or no importance. In a further embodiment, the priority score can be a real value.

A threshold can be used to determine the messages with the highest priority. For example, a threshold of 0.7 is applied to the priority scores of the messages received for a user. Any message with a priority score of 0.7 or above can be identified as an important message and provided to the user as such. However, in a further embodiment, only an n-total number of messages may be provided to the user as important. In one example, n equals 3 and thus, messages associated with the three highest priority scores are selected for providing to the user as important messages. In yet a further embodiment, a combination of the threshold and n-number of messages can be used to identify important messages.

Figure 3:
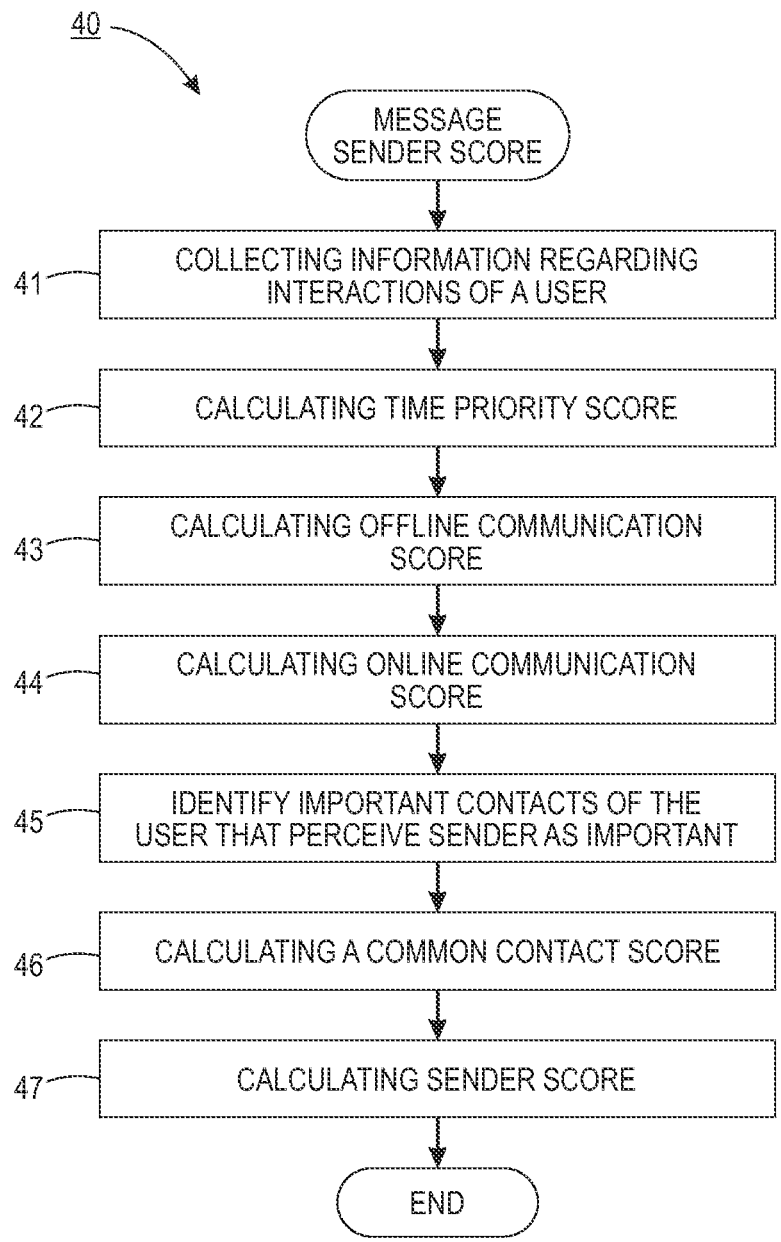
FIG. 3 is a flow diagram showing, by way of example, a process for determining a sender score for an electronic message.

The sender score helps prioritize messages based on a sender of the message, such that messages from senders who frequently communicate with the recipient user have a higher priority. FIG. 3 is a flow diagram showing, by way of example, a process 40 for determining a sender score for an electronic message. For each message received for a user, the sender is identified and information regarding interactions between the user and the sender is collected (block 41) for calculating the sender score as described in detail in U.S. Patent Application Publication No. 2013/0289939, to Brdiczka, which is hereby incorporated by reference in its entirety. The interactions can include face-to-face interactions, such as in-person meetings, online interactions, and offline interactions. The online interactions can include email, instant messaging, interactions on social networking websites, and web conferencing. Offline interactions can include telephone calls, and SMS text messaging. Other types of online and offline interactions are possible.

Based on the interactive information collected, a score for time priority is calculated (block 42). The time priority score can be a binary variable that is calculated based on an amount of time the user spent at scheduled meetings with the sender and an occurrence frequency of the scheduled meetings between the user and the sender. Alternatively, the time priority value can be calculated based on an amount of time the user spent in a vicinity of the sender and an occurrence frequency of the interactions when the user was in the vicinity of the sender. A score is also calculated (block 43) for offline interactions between the user and the sender. The score can be a binary variable, which is determined based on an amount of time the user spent on offline communications with the sender and on an occurrence frequency of the offline communications between the user and the sender. Next, a score is calculated (block 44) for the online communications between the user and the sender. The online communication score can be a binary variable that is based on a number of online communications between the user and the sender, a number of the online communications, and a number of emails sent from the user to the sender. In a further embodiment, other types of online communication can be considered for the online communication score, including a number of reply emails sent from the user to the sender, a number of emails sent from the sender to the user, a number of reply emails from the sender to the user, and a number of days since a last email was received from or sent to the sender by the user, as described in U.S. Patent Application Publication No. 2013/0289939, to Brdiczka, which is hereby incorporated by reference in its entirety.

Each message is also evaluated (block 45) to identify a number of important contacts of the user that perceive the sender of that message to be important and a common contact score is determined (block 46). Finally, the sender priority score is determined (block 47) based on the time priority score, offline score, online score, and common sender score. The sender priority score can be a binary variable or alternatively, the sender priority score can represent a real value. In a further embodiment, the sender can manually set sender priorities by assigning a numeric value to each sender. Those senders with higher assigned priority scores are determined to be more important.

Figure 4:
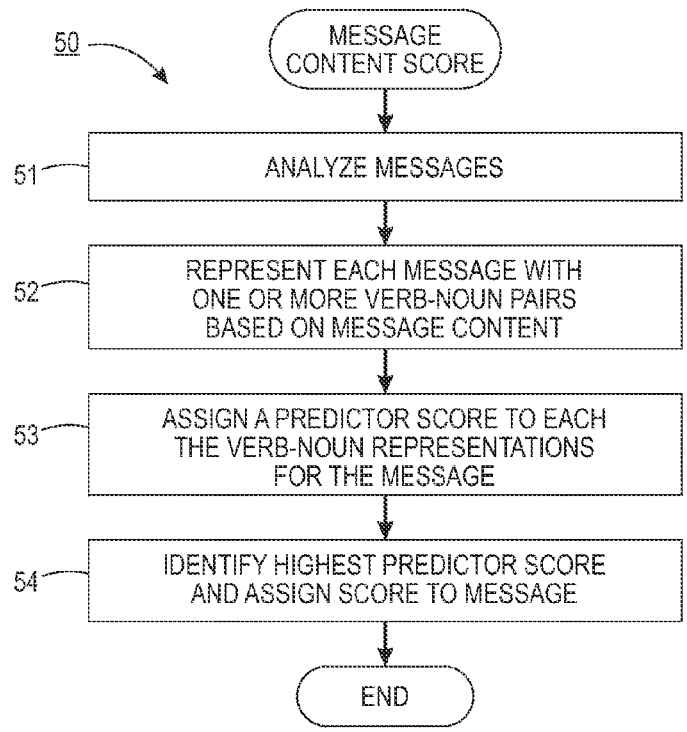
FIG. 4 is a flow diagram showing, by way of example, a process for determining a content score for an electronic message.

Each message received for the user can also be analyzed for determining a content score, which assigns priority to documents that include a request for an action or proposed actions. Messages are commonly used to negotiate and delegate shared tasks, some of which may be urgent. Thus, detecting a purpose of the message can be helpful in accurately prioritizing the messages. FIG. 4 is a flow diagram showing, by way of example, a process for determining a content score for an electronic message. Each message intended for a user is analyzed (block 51) prior to providing the message to the user. Content of each message is processed to identify (block 52) one or more verb-noun pairs that are representative of the message. The verb-noun pairs are identified using a pretrained speech predictor to identify the verb-noun pairs. In one example, the most common verbs for a message with an action include deliver, request, commit, and propose. Meanwhile, the most common nouns for messages with an action include meeting and data.

The speech predictor can be trained using a large electronic message data set via machine learning methods, such as support vector machines. Features used by the speech predictor to identify the verb-noun pairs include bag-of-words, such as unigrams and bigrams, part-of-speech tags, person name patterns, and time patterns. Once trained, the electronic messages are input into the speech predictor to identify the verb-noun pairs for each message and to assign (block 53) a content predictor score to each verb-noun pair in the message. The highest verb-noun pair for the message is then assigned (block 54) to the message as the content score. Messages that require immediate action from the user are associated with higher content scores than messages that have no requirement for action or that have no urgent actions that need to be completed.

Figure 5:
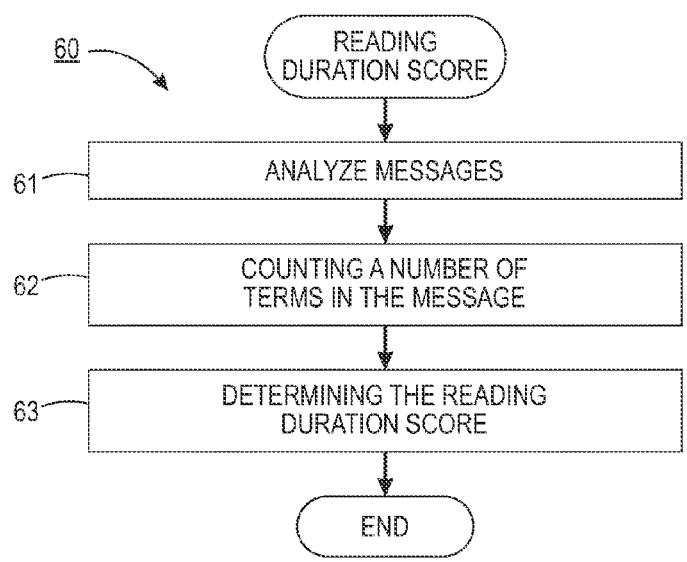
FIG. 5 is a flow diagram showing, by way of example, a process for determining a reading duration score for an electronic message.

Message prioritization can also be based on a duration of time needed to read the message, which is correlated to message length. For instance, many users have limited time to review a message so higher priority is given to messages that are shorter and can be easily reviewed within the limited time period. FIG. 5 is a block diagram showing, by way of example, a process 60 for determining a reading duration score for an electronic message. Messages intended for a user are analyzed (block 61) to determine a content score. During the analysis, a number of terms within each message is counted (block 62) and a reading duration score is assigned (block 63) based on the number of terms. Specifically, the duration score DS can be calculated using the following equation:

$$DS = \frac{0.5}{\left(1 + e^{7.0*\left(\frac{c}{100}-0.6\right)}\right)} + 0.5 \qquad \text{Eq. 1}$$

where c is a count of the terms in the message, e is the base of the natural logarithm and $e^x$ calculates the exponential value of x.

Figure 6:
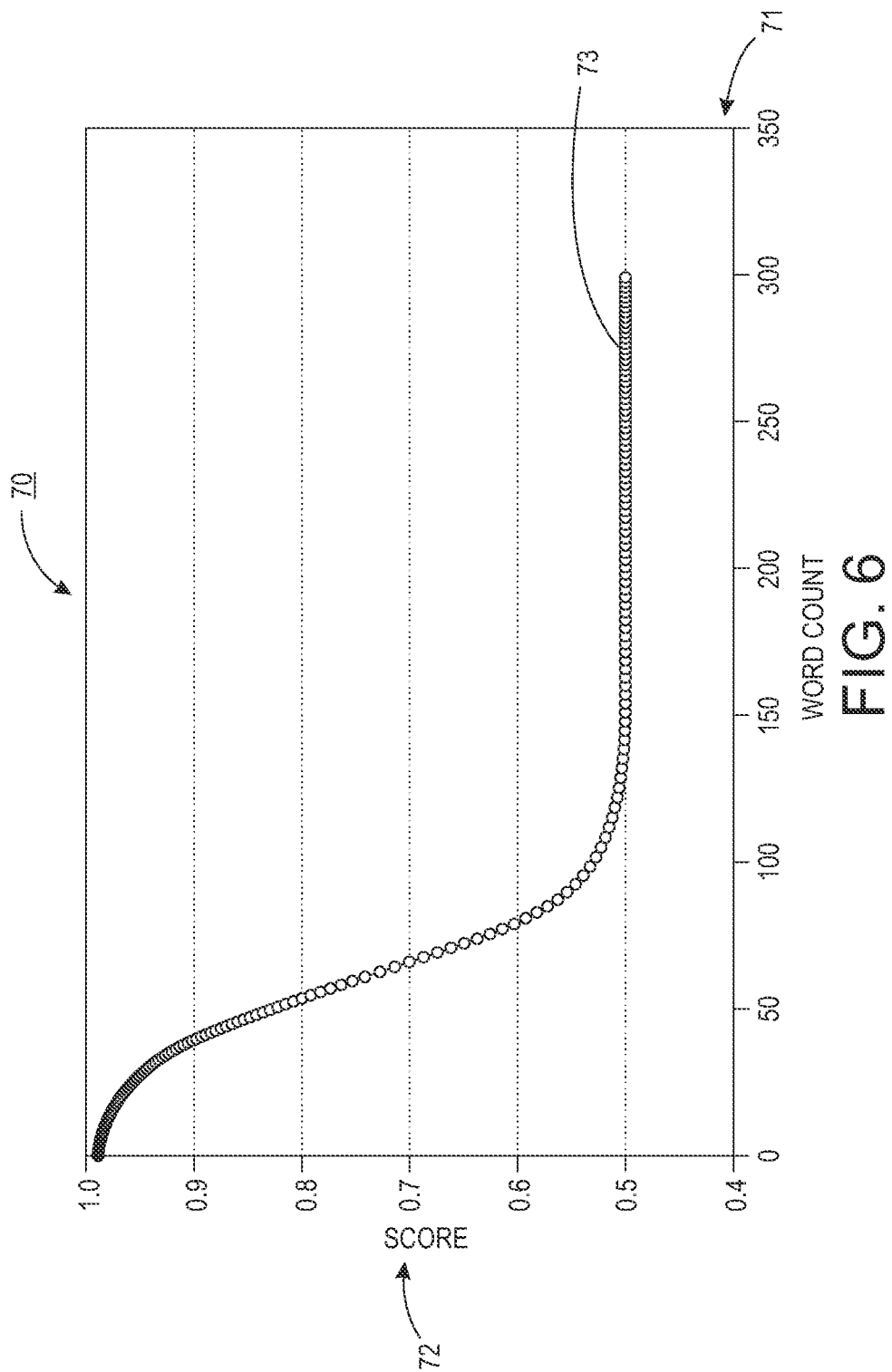
FIG. 6 is a block diagram showing, by way of example, a graph showing a correlation of the reading duration score of FIG. 5 and word count of an electronic message.

The scores can be mapped in relation to word count as a Sigmoid function. FIG. 6 is a block diagram showing, by way of example, a graph 70 showing a correlation of the reading duration score of FIG. 5 and word count of an electronic message. Word count is located along an x-axis 71 of the graph 70, while the duration score is located along a y-axis 72. Values for the duration score are plotted along a curve 73 for messages with a particular word count. The curve 73 shows that when the message has only a few words, a high duration score is assigned, but as the number of words increases, the duration score decreases. Once the number of terms in each message reaches or exceeds a predefined threshold for a number of terms, a common duration score is assigned since users cannot finish reading messages of a certain length during a limited amount of time. For example, when a message includes 110 words, a duration score of 0.5 is assigned to all messages that have 110 words or more.

In a further embodiment, the duration score can be determined solely on a difficulty of the words in the message or a complexity of the sentence structure used in the message. For example, word difficulty can be determined using a predefined list of words with associated difficulty scores. Subsequently, the difficulty scores for the words in the message can be summed for a total difficulty value. The higher the total difficulty score, the lower the priority since the message may be difficult for the user to read and comprehend. In yet a further embodiment, the duration score can be based on the word count of the message in combination with the word difficulty or sentence complexity.

Figure 7:
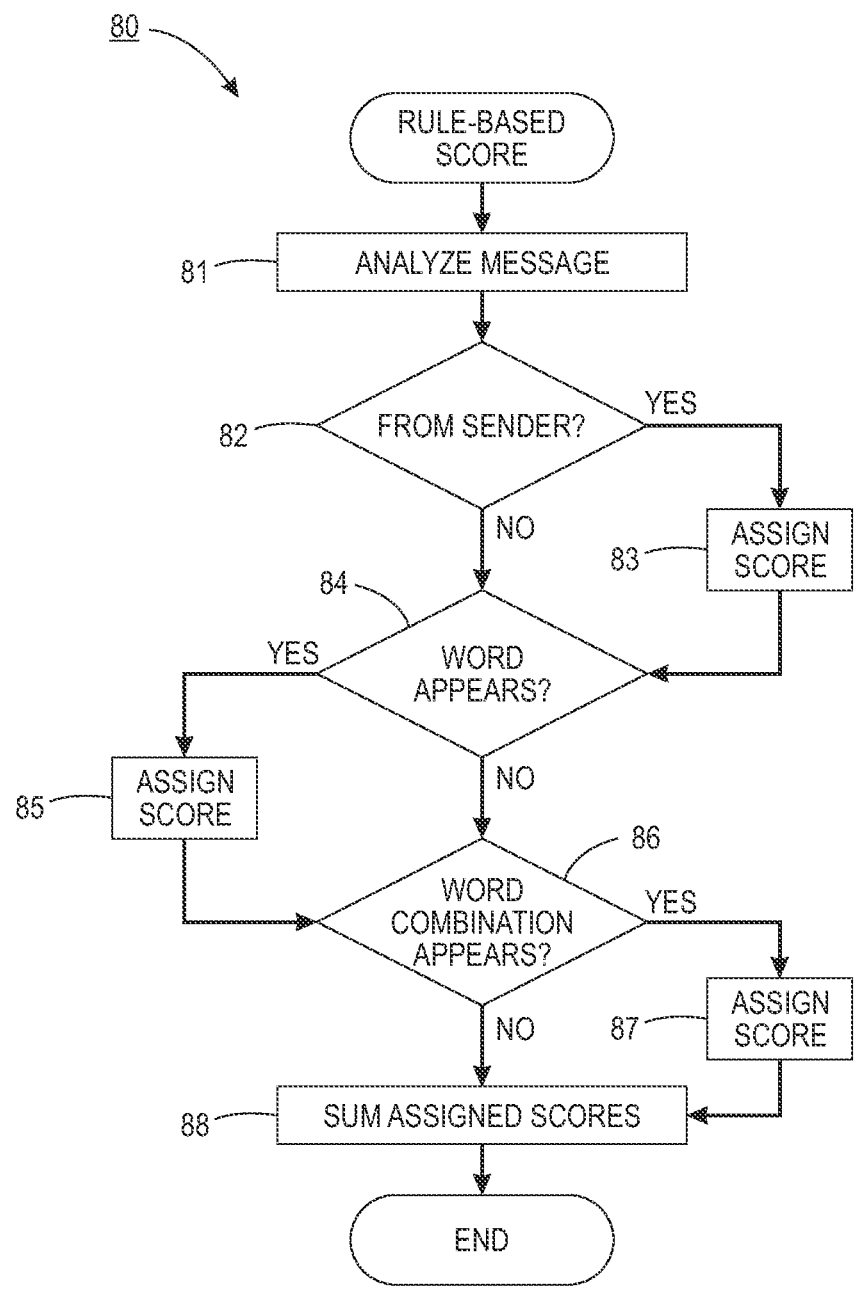
FIG. 7 is a flow diagram showing, by way of example, a process for determining a rule-based score for an electronic message.

Predefined rules can also be applied to a message during message prioritization to ensure that messages with key terms of interest to the user are provided as high priority. FIG. 7 is a flow diagram showing, by way of example, a process 80 for determining a rule-based score for an electronic message. Messages intended for a user are analyzed (block 81) to determine a rule-based score for each message. A sender rule that includes a list of one or more senders and associated scores can be applied to each message. If a message is from (block 82) one or more senders on the list, a score corresponding to the matching senders is assigned (block 83). Subsequently, a further rule can be applied. If the message is not from one of the senders on the list, a further rule is applied.

A word rule can also be applied to the message, during which a predetermined list of terms and associated scores can be compared to content of the message. If the message includes (block 84) one or more words from the list, a score corresponding to the matching words is assigned (block 85) and a further rule can be applied to the message. If the message does not include at least one of the words from the list, no score is assigned and a further rule can be applied.

A list of word combinations and associated scores can be maintained and applied to the message as a word combination rule. If the message includes (block 86) one or more of the word combinations on the list, a score associated with the matching word combination is assigned (block 87). If the message does not include one of the word combinations on the list, no score is assigned. Further rule can be applied, such as, for example, a contact rule, which includes maintaining a list of contacts associated with the user and corresponding scores. If the message includes the name of one or more contacts from the list, a corresponding score is assigned. However, once all the rules have been considered, the assigned scores are summed (block 88) and designated as the rule-based score, which is assigned to the message. In one embodiment, the rule-based score can be a binary variable where 1 equals high importance and 0 equals no importance. If the rule-based score is larger than 1, the score is capped as 1.

The rule-based score is then used along with the sender score, content score, and duration score to determine a priority score for each message. Once determined, the messages intended for the user are prioritized based on the priority scores. In one embodiment, the priority score PS can be calculated using the following equation:

$$PS = w_1 * SenderScore + w_2 * ContentScore + w_3 * DurationScore + w_4 * RuleScore \quad \text{Eq. 2}$$

where $w_1$, $w_2$, $w_3$, and $w_4$ are weights for the scores. Example weights can include 0.35 for $w_1$, 0.65*0.3 for $w_2$, 0.65*0.2 for $w_3$, and 0.65*0.5 for $w_4$. However, other weights are possible. The values, whether binary or real numbers, for the SenderScore, ContentScore, DurationScore, and RuleScore, are input into the equation to calculate the priority score for each message.

Figure 8:
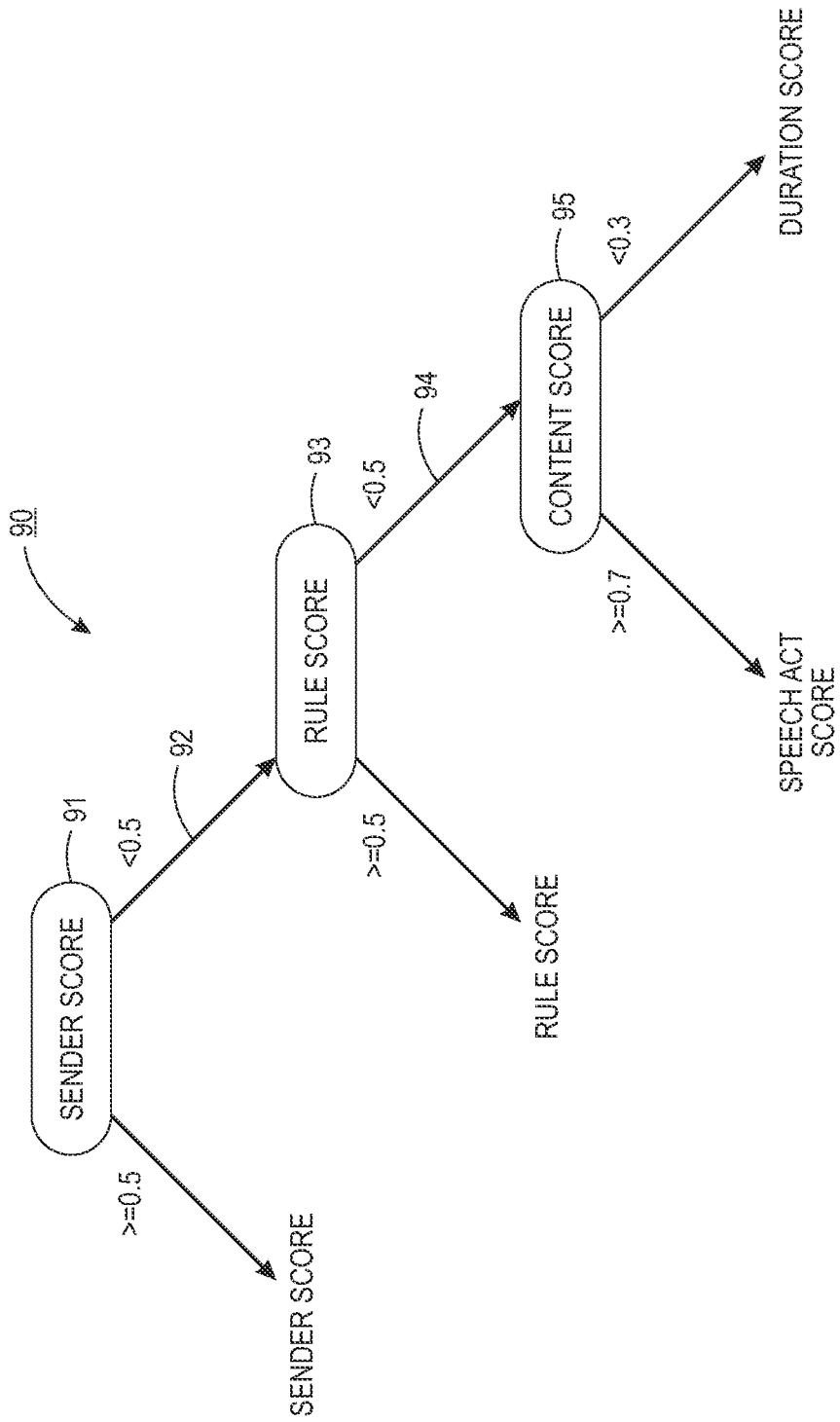
FIG. 8 is a flow diagram showing, by way of example, a decision tree for determining a priority score for an electronic message.

Alternatively, a decision tree can be used to determine the priority score. FIG. 8 is a flow diagram showing, by way of example, a decision tree 90 for determining a priority score for an electronic message. Each message intended for the user can be applied to the decision tree to determine the priority score for that message. The decision tree can include nodes for each score type and paths to connect the nodes. A top level of the decision tree 90 includes a node for sender score 91. If the sender score for a message is greater than or equal to 0.5, then the sender score is designated as the priority score for the message. However, if the sender score is less than 0.5, a path 92 to the next node for rule-based scores is followed. If the rule-based score 93 for the message is greater than or equal to 0.5 then the rule-based score is assigned to the message as the priority score, but if the rule-based score is less than 0.5, a path 94 to the next node for content score is followed. If the content score 95 for the message is greater than or equal to 0.7, the content score is assigned to the message as the priority score. However, if the content score is less than 0.3, the duration score of the message is assigned as the priority score. Other decision trees are possible, such as one with a different order of the scores.

Once priority scores are assigned to the messages intended for a user, the messages can be ordered by priority score to determine important messages. As described above, a threshold can be applied to the priority scores of the messages to determine the important, or highest priority messages. For example, any message with a priority score of 0.7 or above can be identified as an important message and provided to the user as such. Alternatively, only an n-number of messages may be provided to the user as important. In one example, n equals 3 and thus, the messages associated with the three highest priority scores are selected for providing to the user as important messages even if one or more of the messages has a priority score below 0.7. Additionally, a combination of the threshold and n-number of messages can be used to identify important messages.

In a further embodiment, a "TO" field and a "CC" or "BCC" field of the electronic messages are analyzed. If the user is in the "CC" or "BCC" fields, the user may not be a direct target of the message and a priority of the message for the user should be decreased. For example, when the user is not in the "TO" field, a predetermined value can be subtracted from the final priority score for the message. Alternatively, a constant value between 0 and 1 can be multiplied to the priority value when the user is not in the "TO" field to decrease a priority of that message. The messages can then be reordered based on the revised priority scores.

Figure 9:
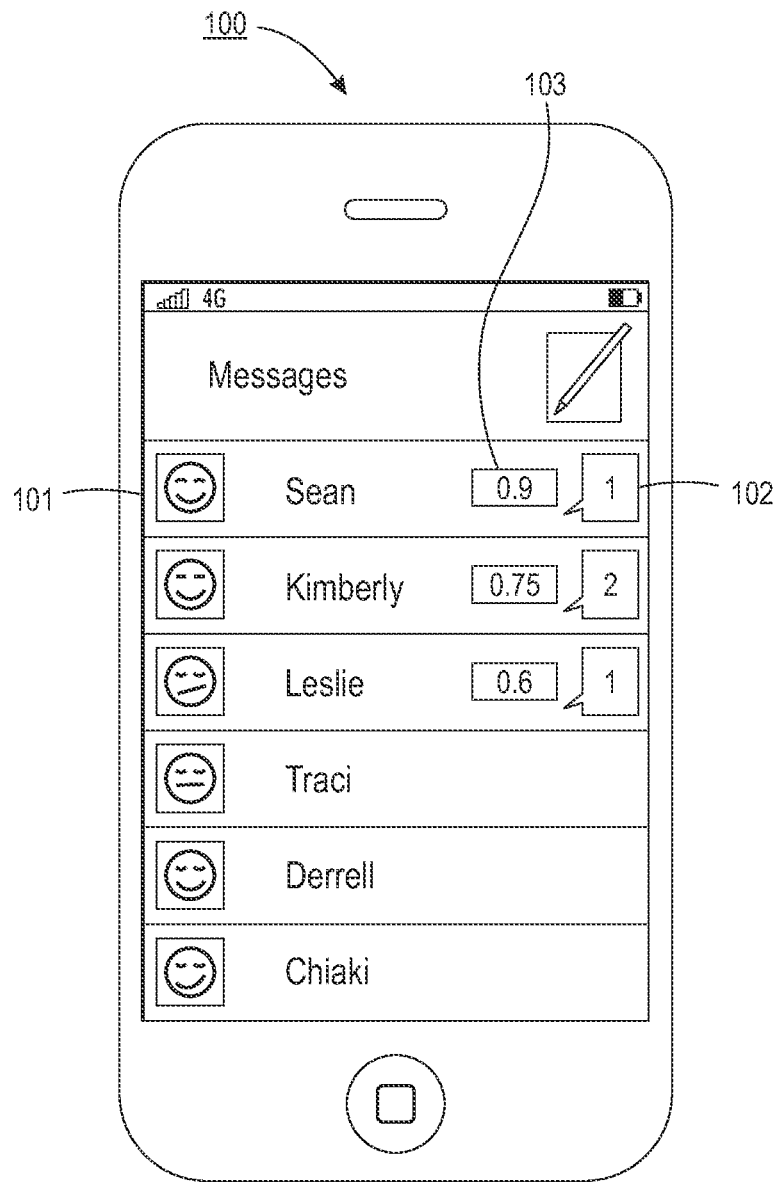
FIG. 9 is a block diagram showing, by way of example, a notification screen with a list of messages received from a common communication channel.

The important, or highest priority, messages can be provided or displayed to the user by themselves or with lower priority messages. FIG. 9 is a block diagram showing, by way of example, a notification screen of a mobile device 100 with a list of messages received from a common communication channel. The messages 101 displayed in this example are, for example, all SMS text messages. The display for each message 101 can include a name of the sender, a photo of the sender, a number of new messages from the sender 102, and a priority score 103 for the message. In one example, the messages can be ordered in descending order based on the priority score 103 so that the highest priority message is at the top of the user's display. Those messages that are not as important can be listed below the high priority messages in order of time received or based on the assigned priority scores.

Figure 10:
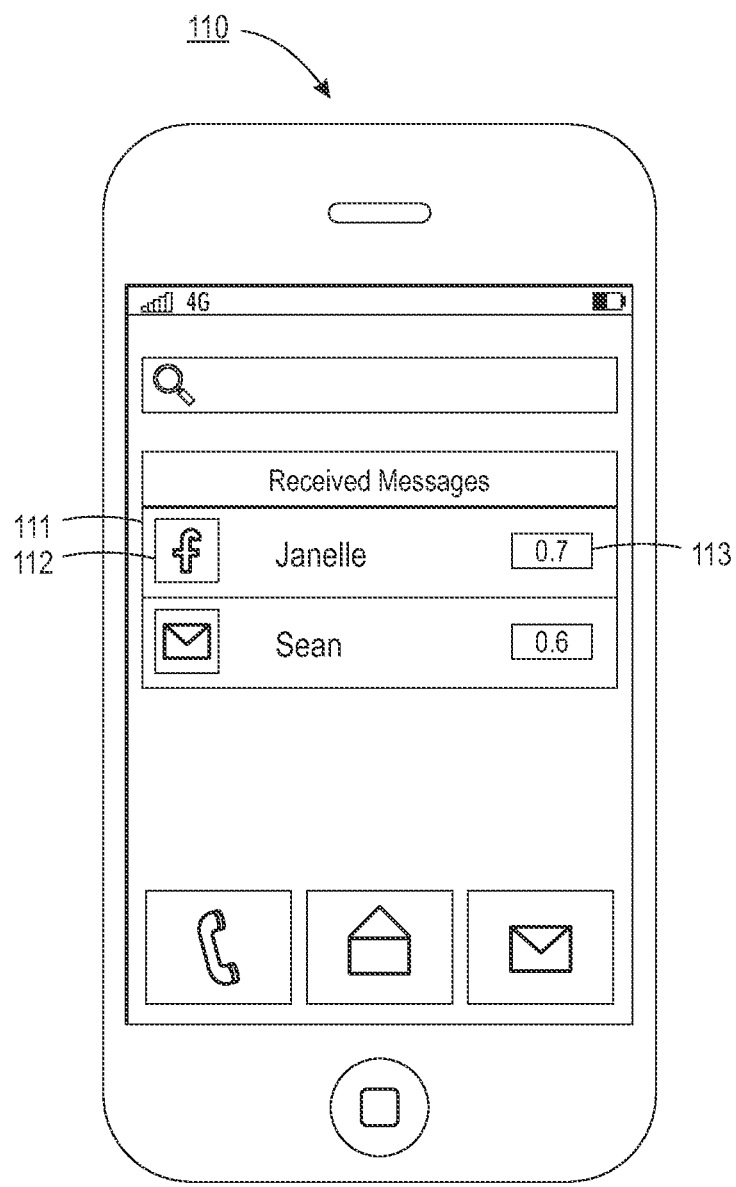
FIG. 10 is a block diagram showing, by way of example, a notification screen with a list of messages received from different communication channels.

In a further example, messages from different communication channels can be displayed. FIG. 10 is a block diagram showing, by way of example, a notification screen of a mobile device 110 with a list of messages received from different communication channels. The messages 111 can appear on a display screen of the mobile device as a pop-up notification or as a message. Each message can include the communication channel through which the message was sent, an identification of the sender, and the priority score for that message. As described above with reference to FIG. 9, the messages can be displayed in descending order of priority. In one example, only the high priority messages are displayed. However, in a further example, all unviewed messages received by the user can be displayed.

In a further embodiment, to assist each user in focusing on a most important part of a high priority message, an importance of each sentence within the message can be determined. Specifically, each message is segmented into sentences and an importance of the sentences is assessed using the content scoring and rule-based scoring determinations, as described above with reference to FIGS. 4 and 7, respectively. A content score and rule-based score are assigned to each sentence and the highest score is selected as the sentence priority score. Other methods for determining the sentence priority score are possible, including an average value of the score, a weight sum of the scores, or a decision tree, as described above with respect to FIG. 8.

The sentences can be prioritized, or ordered, based on the sentence priority scores. Subsequently, a threshold can be applied to the priority scores. The sentences that satisfy the threshold can be designated as important sentences. In one embodiment, the important sentences within a message can be highlighted to draw the user's attention to those sentences. In a further embodiment, the message can be displayed with a summary based on one or more of the important sentences. For instance, the sentence with the highest sentence priority score can be selected for summarizing the message. If there is still room in the display for that message, a sentence with the next highest sentence priority score can be selected as part of the summary. Sentences can continue to be selected until the display is full for that message.

In a further embodiment, the message prioritization can be used with other factors to determine when to provide the message to the driver, as described in U.S. patent application Ser. No. 14/581,975, titled "System and Method for Determining An Appropriate Time for Providing a Message to a Driver," filed on Dec. 23, 2014, the disclosure of which is hereby incorporated by reference. Additionally, message prioritization can be used in an audio centric network, as described in U.S. patent application Ser. No. 14/582,005, "titled "System and Method for Facilitating Driver Communication Via An Audio Centric Network," filed on Dec. 23, 2014, the disclosure of which is hereby incorporated by reference.

While the invention has been particularly shown and described as referenced to the embodiments thereof, those skilled in the art will understand that the foregoing and other changes in form and detail may be made therein without departing from the spirit and scope of the invention.

What is claimed is:

1. A method for prioritizing messages based on message importance, comprising:
   receiving for a recipient, messages from one or more senders, wherein the messages are stored in a database;
   identifying a plurality of verb-noun pairs within at least one of the messages via a speech predictor that is trained via machine learning;
   identifying for each of the received messages, an identity of the sender of that message and determining a sender priority based on the sender identity via a server comprising memory, a central processing unit, an input port configured to receive the messages from the database, and an output port;
   determining via the central processing unit a content priority of each of the received messages, comprising:
      assigning a score to each of the plurality of verb-noun pairs identified in that message;
      identifying for that message a verb-noun pair with the highest score; and
      assigning the score of the identified verb-noun pair with the highest score to that message;
   determining for each of the received messages, a length of time required to read that message via the central processing unit and assigning a message length priority to that message based on the length of time;
   calculating via the central processing unit an importance value for each of the received messages based on the sender priority, the content priority, and the message length priority using one of a decision tree and a summation of the sender priority, the content priority, and the message length priority;
   identifying those messages with importance values that satisfy a predetermined threshold as high priority messages via the central processing unit; and
   providing the high priority messages to the recipient via a mobile communication device.

2. A method according to claim 1, further comprising:
   calculating for each sender, a score based on the identity of that sender, comprising:
      determining face-to-face communications between the recipient and the sender;
      determining offline interactions between the recipient and the sender;
      determining online interactions between the recipient and the sender;
      counting a number of important contacts of the recipient that perceive the sender to be important; and
      calculating a sender priority score based on the face-to-face communications, offline interactions, online interactions, and number of important contacts.

3. A method according to claim 2, wherein the face-to-face communications comprise at least one of an amount of time the recipient spent with the sender during meetings and an occurrence frequency of the meetings, and an amount of time the recipient spent in a vicinity of the sender and an occurrence frequency of the sender in the vicinity of the sender.

4. A method according to claim 2, wherein the offline interactions comprise an amount of time the recipient spent on offline and telephone communications with the sender and an occurrence frequency of the offline and telephone communications.

5. A method according to claim 2, wherein the online interactions comprise at least one of a number of online interactions between the recipient and the sender, a number of emails sent from the recipient to the sender, and a number of reply emails sent from the recipient to the sender.

6. A method according to claim 1, further comprising:
identifying a request within at least one of the messages based on the verb-noun pairs; and
assigning a higher content priority score to the message that includes the request.

7. A method according to claim 1, further comprising:
assigning a duration score to one such message based on the length of time required to read that message, comprising:
counting a number of terms in the message; and
calculating the duration score based on the number of terms.

8. A method according to claim 1, further comprising:
maintaining a list of important senders, keywords, and combinations of the key terms;
calculating a rule-based score for each of the messages, comprising at least one of:
determining whether the message includes a key term from the list with key term combinations and summing a value associated with the key term to the importance value;
determining whether the message includes a sender from the list and summing a value associated with the sender to the importance value; and
determining whether the message includes a combination of the keywords from the list and summing a value associated with the combination to the importance value.

9. A method according to claim 1, further comprising:
determining the importance value of each message via the summation comprising multiplying each score with a weight and summing the weighted scores.

10. A method according to claim 1, further comprising:
determining whether the recipient is in a "to" field of the message; and
decreasing the importance value of the message when the recipient is not in the "to" field.

11. A method according to claim 1, further comprising:
identifying for at least one of the high priority messages, a segment of that message that is most important; and
highlighting the most important segment in the message.

12. A system for prioritizing messages based on message importance, comprising:
a database storing messages received for a recipient from one or more senders;
a speech predictor identifying a plurality of verb-noun pairs within at least one of the messages, wherein the speech predictor is trained via machine learning; and
a server comprising memory, a central processing unit, an input port configured to receive the messages from the database, and an output port, wherein the central processing unit is configured to:
identify for each of the received messages, an identity of the sender of that message and determine a sender priority based on the sender identity;
determine a content priority of each of the received messages by assigning a score to each of the plurality of verb-noun pairs identified in that message, identifying for that message a verb-noun pair with the highest score, and assigning the score of the identified verb-noun pair with the highest score to that message;
determine for each of the received messages, a length of time required to read that message and assign a message length priority to that message based on the length of time;
calculate an importance value for each of the received messages based on the sender priority, the content priority, and the message length priority using one of a decision tree and a summation of the sender priority, the content priority, and the message length priority;
identify those messages with importance values that satisfy a predetermined threshold as high priority messages; and
provide the high priority messages to the recipient via a mobile communication device.

13. A system according to claim 12, wherein the central processing unit calculates for each sender, a score based on the identity of that sender by determining face-to-face communications between the recipient and the sender, determining offline interactions between the recipient and the sender, determining online interactions between the recipient and the sender, counting a number of important contacts of the recipient that perceive the sender to be important, and calculating a sender priority score based on the face-to-face communications, offline interactions, online interactions, and number of important contacts.

14. A system according to claim 13, wherein the face-to-face communications comprise at least one of an amount of time the recipient spent with the sender during meetings and an occurrence frequency of the meetings, and an amount of time the recipient spent in a vicinity of the sender and an occurrence frequency of the sender in the vicinity of the sender.

15. A system according to claim 13, wherein the offline interactions comprise an amount of time the recipient spent on offline and telephone communications with the sender and an occurrence frequency of the offline and telephone communications.

16. A system according to claim 13, wherein the online interactions comprise at least one of a number of online interactions between the recipient and the sender, a number of emails sent from the recipient to the sender, and a number of reply emails sent from the recipient to the sender.

17. A system according to claim 12, wherein the central processing unit identifies a request within at least one of the messages based on the verb-noun pairs for that message and assigns a higher content priority score to the message that includes the request.

18. A system according to claim 12, wherein the central processing unit assigns a duration score to one such message based on the length of time required to read that message, by counting a number of terms in the message and calculating the duration score based on the number of terms.

19. A system according to claim 12, further comprising:
a list of important senders, keywords, and combinations of the key terms, wherein the central processing unit calculates a rule-based score for each of the messages by determining one of:
whether the message includes a key term from the list of key term combinations and summing a value associated with the key term to the importance value;
whether the message includes a sender from the list and summing a value associated with the sender to the importance value; and
whether the message includes a combination of the keywords from the list and summing a value associated with the combination to the importance value.

20. A system according to claim 12, wherein the central processing unit determines the importance value of each message via the summation comprising multiplying each score with a weight and summing the weighted scores.

21. A system according to claim 12, wherein the central processing unit determines whether the recipient is in a "to" field of the message and decreases the importance value of the message when the recipient is not in the "to" field.

22. A system according to claim 12, wherein the central processing unit identifies for at least one of the high priority messages, a segment of that message that is most important and highlights the most important segment in the message.

* * * * *